(12) United States Patent
Versaevel et al.

(10) Patent No.: US 11,629,644 B2
(45) Date of Patent: Apr. 18, 2023

(54) ACOUSTIC ATTENUATION PANEL COMPRISING A FRONT SKIN AND A CENTRAL STRUCTURE

(71) Applicants: SAFRAN, Paris (FR); Safran Nacelles, Gonfreville l'Orcher (FR)

(72) Inventors: Marc Versaevel, Gonfreville l'Orcher (FR); Jean-Philippe Ginefri, Gonfreville l'Orcher (FR); Fabrice Provost, Gonfreville l'Orcher (FR); Jeremy Quesnel, Gonfreville l'Orcher (FR); Wouter Balk, Moissy Cramayel (FR); Sébastien Louchard, Gonfreville l'Orcher (FR); Loïc Hervé André Le Boulicaut, Gonfreville l'Orcher (FR)

(73) Assignees: Safran Nacelles, Gonfreville l'Orcher (FR); SAFRAN, Paris (FR)

( * ) Notice: Subject to any disclaimer, the term of this patent is extended or adjusted under 35 U.S.C. 154(b) by 1009 days.

(21) Appl. No.: 16/411,199

(22) Filed: May 14, 2019

(65) Prior Publication Data

US 2019/0264614 A1 Aug. 29, 2019

Related U.S. Application Data

(63) Continuation of application No. PCT/FR2017/053110, filed on Nov. 14, 2017.

(30) Foreign Application Priority Data

Nov. 14, 2016 (FR) ........................................ 1660978

(51) Int. Cl.
*F02C 7/24* (2006.01)
*B29D 24/00* (2006.01)
(Continued)

(52) U.S. Cl.
CPC .............. *F02C 7/24* (2013.01); *B29D 24/005* (2013.01); *G10K 11/172* (2013.01);
(Continued)

(58) Field of Classification Search
CPC ....... F02C 7/24; B29D 24/005; G10K 11/172; B29C 45/37; B29C 2793/0018;
(Continued)

(56) References Cited

U.S. PATENT DOCUMENTS 4,449,607 A * 5/1984 Forestier ................. F02K 1/827
428/116
5,785,919 A 7/1998 Wilson
(Continued)

FOREIGN PATENT DOCUMENTS

EP 2291840 1/2016
FR 2811129 1/2002
(Continued)

OTHER PUBLICATIONS

International Search Report for International Application PCT/FR2017/053110, dated Jan. 23, 2018.

*Primary Examiner* — Forrest M Phillips
(74) *Attorney, Agent, or Firm* — Burris Law, PLLC

(57) ABSTRACT

An acoustic attenuation panel for a propulsion assembly includes an acoustic front skin having perforations, and a central structure formed from partitions arranged perpendicularly in order to make up cells, wherein the front skin and the central structure form the panel which is made as a single piece and is provided for directly covering a surface of an element of the propulsion assembly forming a rear skin which closes the cells of the central structure at the rear.

13 Claims, 2 Drawing Sheets

(51) Int. Cl.
  *G10K 11/172* (2006.01)
  *B29C 33/00* (2006.01)
  *B29C 45/00* (2006.01)
  *B29C 45/37* (2006.01)
  *B29K 105/04* (2006.01)
  *B29L 31/60* (2006.01)

(52) U.S. Cl.
  CPC ........ *B29C 33/0033* (2013.01); *B29C 45/006* (2013.01); *B29C 45/37* (2013.01); *B29C 2793/0018* (2013.01); *B29K 2105/04* (2013.01); *B29L 2031/60* (2013.01); *F05D 2230/21* (2013.01); *F05D 2260/963* (2013.01); *Y02T 50/60* (2013.01)

(58) Field of Classification Search
  CPC ............. B29K 2105/04; B29L 2031/60; F05D 2230/21; F05D 2260/963; Y02T 50/60
  USPC ........................................................ 181/292
  See application file for complete search history.

(56) References Cited

U.S. PATENT DOCUMENTS

| | | | | |
|---|---|---|---|---|
| 5,975,237 A * | 11/1999 | Welch | ................... | B64D 33/06 |
| | | | | 181/290 |
| 7,935,205 B2 * | 5/2011 | Bogue | ................... | B29C 73/06 |
| | | | | 428/116 |
| 7,967,108 B2 * | 6/2011 | Harper | ................... | F02C 7/045 |
| | | | | 181/290 |
| 8,061,967 B2 * | 11/2011 | Marlin | ................... | F02K 3/06 |
| | | | | 415/9 |
| 9,919,786 B2 * | 3/2018 | Endres | ................... | B29C 70/24 |
| 10,024,191 B2 * | 7/2018 | Totten | ................... | F01D 25/24 |
| 10,132,087 B2 * | 11/2018 | Nelson | ................... | B32B 3/266 |
| 10,458,433 B2 * | 10/2019 | Kling | ................... | F01D 25/24 |
| 11,104,086 B2 * | 8/2021 | Wee | ................... | B23P 6/005 |

FOREIGN PATENT DOCUMENTS

| | | |
|---|---|---|
| JP | H03248835 | 11/1991 |
| JP | H06126853 | 5/1994 |

* cited by examiner

ACOUSTIC ATTENUATION PANEL COMPRISING A FRONT SKIN AND A CENTRAL STRUCTURE

CROSS-REFERENCE TO RELATED APPLICATIONS

This application is a continuation of International Application No. PCT/FR2017/053110, filed on Nov. 14, 2017, which claims priority to and the benefit of FR 16/60978 filed on Nov. 14, 2016. The disclosures of the above applications are incorporated herein by reference.

FIELD

The present disclosure relates to the technical field of acoustic attenuation panels, intended in particular to equip inner surfaces of propulsion units for aircraft, as well as aircraft propulsion units equipped with such acoustic panels.

BACKGROUND

The statements in this section merely provide background information related to the present disclosure and may not constitute prior art.

The propulsion units, each comprising a nacelle and an engine such as a turbojet engine for example a bypass turbojet engine, include inner surfaces for aerodynamically guiding the gases which may be cold at the inlet or at the outlet of a cold flow path, or hot at the outlet of the combustion.

In order to reduce the noises emitted by the turbojet engine in operation, a known acoustic panel type, presented in particular by the document EP-B1-2291840, includes an acoustic front skin facing the flow comprising micro-perforations, a central acoustic structure constituting a core having partition walls disposed perpendicularly separating cells forming a honeycomb, and a rear skin.

In general, the skins of the acoustic panels are fastened on the central structure by gluing or an adhesive.

The front skin receiving the sound waves has gas passages formed by the perforations, opening into resonant cavities formed by the closed cells of the central structure, in order to constitute Helmholtz resonators carrying out an attenuation of the acoustic emissions originating from the turbojet engine.

In particular, by selecting the dimensions of the cells of the central structure, in particular the height, a reflection of these waves on the rear skin which returns them towards the perforations of the front skin, is obtained from a sound wave input by the perforations. In this manner, an attenuation of the acoustic intensity is obtained for frequency ranges by visco-thermal effect at the level of the perforations of the acoustic skin.

In particular, the aim is to cover as much as possible of the inner aerodynamic surfaces receiving sound waves, of acoustic panels to reduce the sound emissions of the aircraft.

Nonetheless, these acoustic panels comprising the central structure glued on the two highly rigid skins constitute relatively heavy and expensive sets. In addition, they are suitable for covering large surfaces, but are poorly adapted to effectively cover small surfaces.

Indeed, the honeycomb central structure is usually chamfered at the part edge in order to connect the acoustic skin and the rear skin. The chamfered area is acoustically less effective. This type of loss is minimal on large panels, but not on small parts.

SUMMARY

The present disclosure provides an acoustic attenuation panel provided for a propulsion unit, including an acoustic front skin comprising perforations, then a central structure formed by partition walls disposed perpendicularly to constitute cells, this panel being remarkable in that the front skin and the central structure form the panel manufactured integrally in one-piece, which is provided to directly cover a surface of a carrier element of the propulsion unit forming a rear skin closing at the rear the cells of the central structure.

An advantage of this acoustic attenuation panel is that the surface of the element of the propulsion unit forming the rear skin of the acoustic panel, thus is eliminated the specific rear skin which is generally provided at the rear of the acoustic panels to close the cells. In other words, the front skin and the central structure form the panel manufactured integrally in one-piece, the panel being closed at the front by said acoustic front skin and open at the rear before being positioned on the carrier element. By removing the specific rear skin, the mass of the acoustic panels, as well as the costs, are reduced.

In addition, the manufacture of these acoustic panels including no rear skin, therefore having the cells open at the rear, is easier to carry out, in particular by molding.

The acoustic attenuation panel according to the present disclosure may include one or more of the following features, which may be combined with each other.

Advantageously, the panel includes discrete fastening supports over the surface of the carrier element. In this manner, it is easier to overcome slight deformations of the carrier element or the acoustic panel.

In this case, the discrete fastening supports may include fastening feet disposed parallel to the surface of the carrier element.

Advantageously, the discrete fastening supports are disposed over the external contour of the acoustic panel. In this case, it is possible to cover a large surface of the panel with the acoustic skin.

Advantageously, the panel is shaped so as to have, after the mounting thereof, a clearance between the base of the partition walls and the surface of the carrier element. This clearance allows accepting small geometric deformations of the carrier element or the panel.

In this case, the clearance is advantageously comprised between 0.5 and 1.5 mm.

In particular, the cells of the central structure may have, in the plane of the front skin, contours forming quadrilaterals.

Advantageously, the closed cells of the central structure have, in the plane of the front skin, dimensions smaller than 60 mm.

Advantageously, the panel is formed integrally in one-piece by molding of a synthetic material. This method allows economically producing panels with a surface having complex shapes.

The present disclosure further provides an aircraft propulsion unit including at least one acoustic attenuation panel comprising any one of the preceding features.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
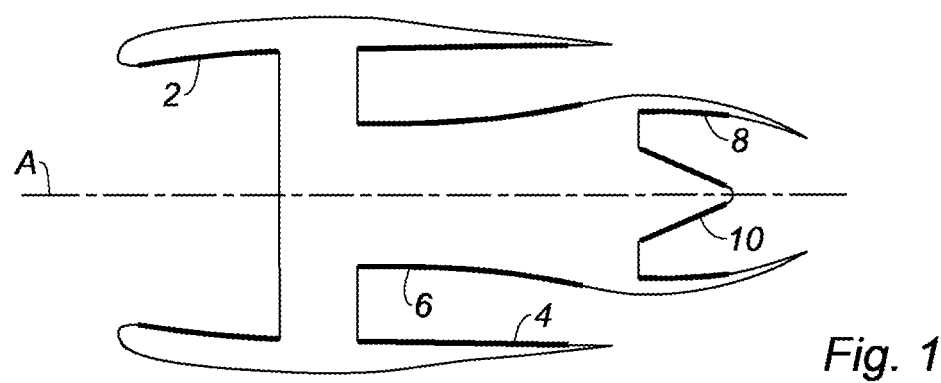
FIG. 1 is a diagram of a turbojet engine having, in axial section, different surfaces receiving an acoustic treatment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a bypass turbojet engine disposed along a main axis A, receiving, on surfaces of internal carrier elements, acoustic attenuation panels, in order to partially absorb the sound waves received on these surfaces.

In particular, the surface facing the axis A of the contour of the cold air inlet 2 is treated, the surfaces facing the axis 4 and the outside 6 of the cold air flow path 5 of the bypass flow, and the surfaces facing the axis 8 and the outside of the hot gases ejection flow.

The acoustic attenuation panels are thus provided for such turbojet engines, that is to say to reduce the noise emitted by these said turbojet engines, in particular at the level of these areas forming aerodynamic guide surfaces then licked by the flow during its use. These acoustic attenuation panels are thus intended to equip, in particular a nacelle surrounding the area of the engine compartment, as illustrated in FIG. 1, said nacelle bearing these aerodynamic guide surfaces.

Figure 2:
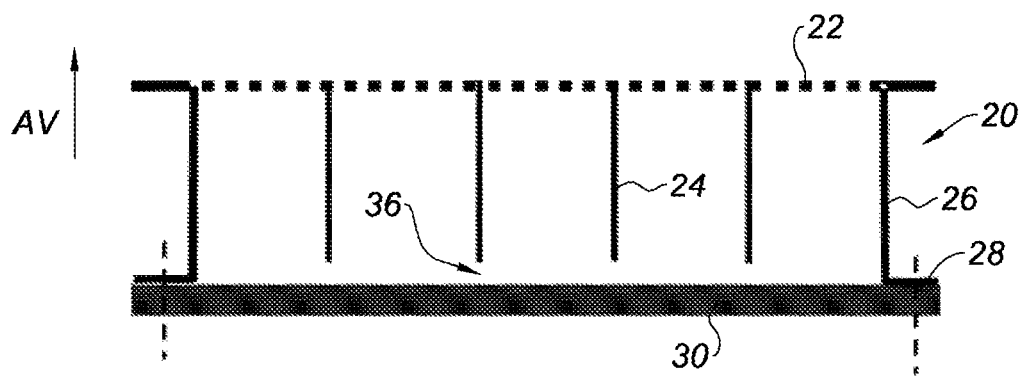
FIG. 2 is a diagram showing, in cross-section, an acoustic attenuation panel according to the present disclosure.

FIG. 2 presents an acoustic panel 20, including on one side, conventionally called front side, indicated by the arrow "AV," an acoustic front skin 22 having perforations. Inner partition walls 24 are disposed below the front skin 22, perpendicularly to this skin. Fastening supports 28, which are one form of discrete fastening supports according to the teachings of the present disclosure, are disposed over the contour of the panel 20.

In order to limit the manufacturing steps, and therefore the cost of the part, the entire panel 20 is made at one time, for example by injection of a thermoplastic material into a mold forming the negative of the part. An acoustic attenuation panel is then obtained including only an acoustic front skin 22 and inner partition walls 24 delimiting cells generally closed (with the exception of the perforations) at the front by said acoustic front skin 22 and open at the rear, that is to say on the side opposite to the acoustic front skin 22.

The fastening supports 28, which in this form are fastening feet, come into contact with the surface of the carrier element 30 to be fastened thereon, the partition walls 24 being slightly shifted from this surface, with a minimum clearance 36 in the range of 1 mm. This clearance is thus obtained by this slight shift of the fastening supports 28 relative to the partition walls 24.

The clearance 36 allows providing that with small deformations relative to a theoretical curvature, of the complete acoustic panel 20 and of the entire surface of the carrier element 30, a strong bearing is still obtained on limited points formed by the fastening supports 28 providing a proper clamping on this element, and a proper positioning of the aerodynamic surface of the front skin 22 in the flow path of the nacelle, without being hindered by the partition walls 24 of the inner structure which could press on this surface if no clearance was provided.

Advantageously, the fastening supports 28 are disposed outside the aerodynamic guide surface, so as to cover this surface with a maximum of acoustic front skin 22 to improve the sound attenuation.

Figures 3, 4:
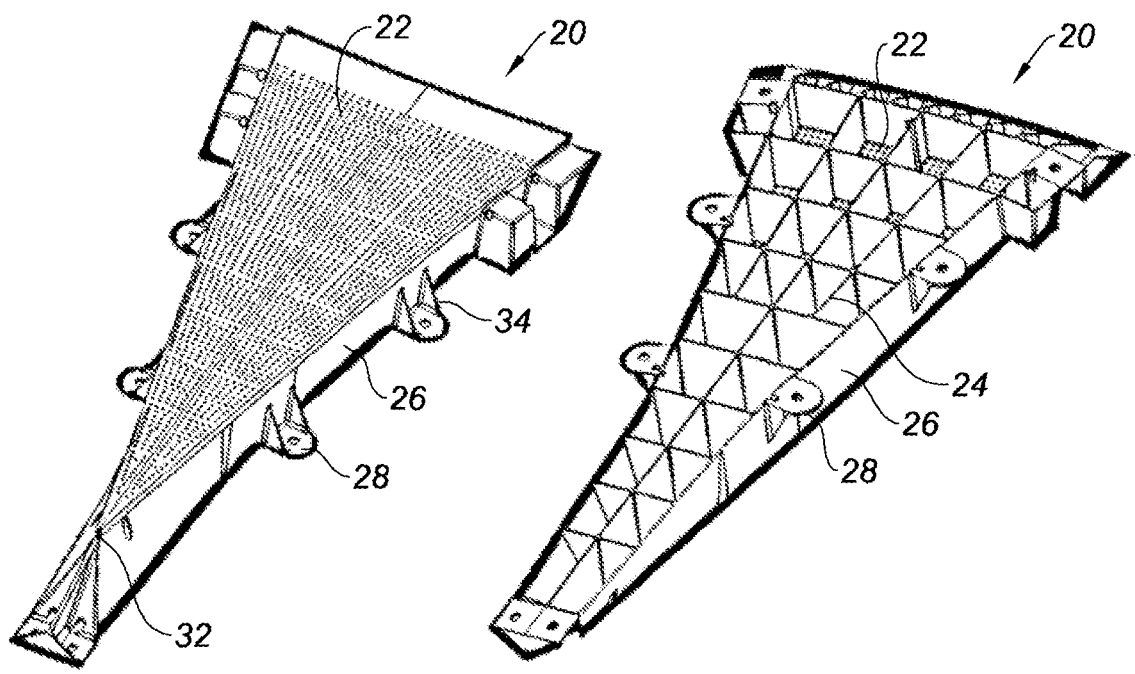
FIG. 3 is a front perspective view of an acoustic panel according to the present disclosure.
FIG. 4 is a rear perspective view of an acoustic panel according to the present disclosure.
Figure 5:
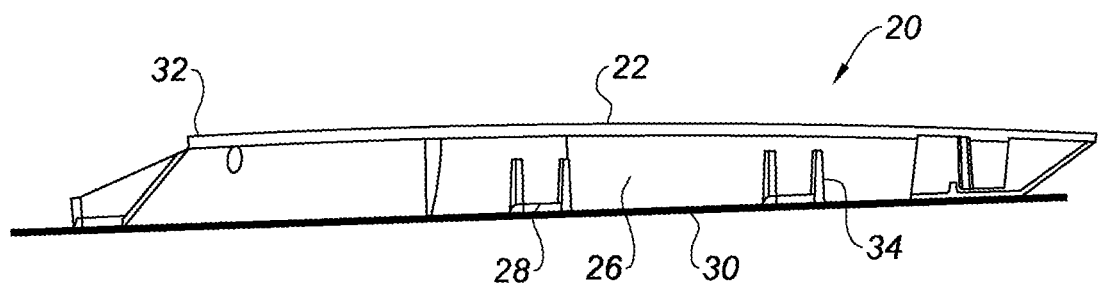
FIG. 5 is a side view of the acoustic panel according to the present disclosure.

FIGS. 3, 4 and 5 show an acoustic panel 20 formed integrally in one-piece by molding of a thermoplastic material, including a generally triangular shape having a tip 32.

In particular, any type of thermoplastic material can be used, but also thermosetting materials formed by molding. It is also possible to provide for a manufacture of the panel 20 with a rapid prototyping method, comprising a three-dimensional printing allowing forming the part without any mold.

The top of the acoustic panel 20 includes the acoustic front skin 22. The underside of this front skin 22 includes a central structure composed of partition walls 24 disposed perpendicularly, forming a grid pattern having substantially square quadrilaterals, which cover the entire perforated surface of this skin.

The acoustic panel 20 includes an external contour 26 having, on the sides and on the front tip 32, fastening supports 28 also formed by molding of the material. Some fastening supports 28 are linked to the external contour 26 by reinforcement triangles 34 providing them with a significant rigidity.

The molding of the acoustic panel 20 is facilitated by the full opening of the cells at the rear, which allows in particular forming a mold comprising two portions connected in a parting plane parallel to this panel, forming, for one, the external side of the front skin 22, and for the other one, the internal side as well as all partition walls 24.

During the molding of the acoustic panel 20, the minimum clearance 36 is provided on all partition walls 24 and the external contour 26, relative to the base of the fastening supports 28, to facilitate the mounting on the surface of the carrier element 30. In this manner, the accuracy constraints on the overall shape of the acoustic panel 20 during the molding thereof are limited, which facilitates its manufacture and reduces costs.

It should be noted that, by this molding principle, parts having small dimensions and low masses can easily be made, in contrast with the conventional panels using a honeycomb structure receiving a skin glued on both sides thereof.

In addition, the clearance 36 formed at the rear of the set of closed cells of the central structure, enables an evacuation of liquids entering into the acoustic panel 20 by the perforations of the front skin 22, in particular water, or possibly fuel in case of failure. By providing a liquid evacuation circuit comprising the clearances 36, an accumulation is avoided, which could in the case of water form ice filling the closed cells and reducing the effectiveness of the acoustic attenuation, or of fuel which could then ignite.

In order to obtain a good level of acoustic attenuation, the perforations of the front skin 22, in one form, represent between 5 and 15% of the active surface of this skin, and advantageously about 10%. In addition, for a good attenuation level up to the frequency of 3000 Hz, the section of the cells in the front skin plane 22 is advantageously inscribed within a square having a 50 mm side.

The perforations of the front skin 22 are advantageously directly made during the molding of the acoustic panel 20, which allows avoiding the drilling phase which is desired for the conventional composite structures including a honeycomb.

The distribution of the perforations and the pitch between these perforations may be scalable depending on the shape of the part, in order to obtain the best distribution without loss between the closed cells.

Figure 6:
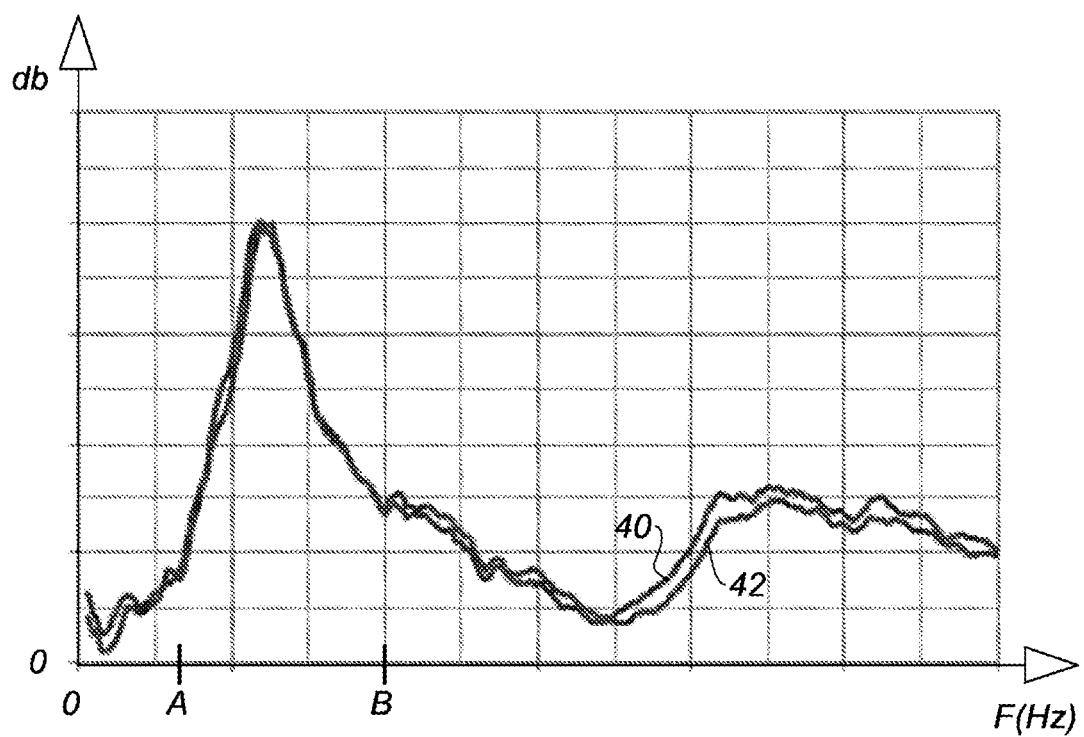
FIG. 6 is a graph obtained by measurements presenting, as a function of frequency, the acoustic attenuation obtained with a panel according to the prior art and a panel according to the present disclosure.

FIG. 6 shows, as a function of the frequency F of a sound wave expressed in Hertz, a first acoustic attenuation curve 40 expressed in decibels, obtained by measurements on an acoustic panel according to the prior art, including the partition walls 24 of the closed cells which completely join a rear skin of this panel, without any interposed clearance.

A second curve 42 presents the acoustic attenuation obtained by measurements on an acoustic panel 20 according to the present disclosure, including the partition walls of the closed cells 24 having a clearance of 1 mm relative to the surface of a carrier element 30 receiving this panel.

The theory about Helmholtz resonators calls for cells, in principle, to be completely closed, including partition walls 24 joining the rear skin of the acoustic panel.

It was observed that the acoustic attenuation performances of the panel according to the present disclosure, are almost equivalent for a frequency comprised between 700 (A) and 2000 Hz (B), and slightly less than 1 dB below the value A, and above the value B.

The acoustic performances of the panel according to the present disclosure are reduced, with panels which are very inexpensive to manufacture, and which can be easily adapted on small surfaces having complex shapes, which allows enlarging the covered surface and generally improving the acoustic attenuation of an engine such as a turbojet engine.

The present disclosure is described above, as example. It is understood that a person skilled in the art is able to carry out different variants of the present disclosure yet without departing from the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An acoustic attenuation panel for a propulsion unit, the acoustic attenuation panel comprising:
   an acoustic front skin comprising perforations; and
   a central structure formed by partition walls disposed perpendicularly to the acoustic front skin to define cells,
   wherein the acoustic front skin and the central structure are molded integrally in one-piece, the cells of the central structure being open at a rear, wherein the acoustic attenuation panel directly covers a surface of a carrier element of the propulsion unit forming a rear skin closing at the rear the cells of the central structure.

2. The acoustic attenuation panel according to claim 1 further comprising discrete fastening supports over the surface of the carrier element.

3. The acoustic attenuation panel according to claim 2, wherein the discrete fastening supports define fastening feet disposed parallel to the surface of the carrier element.

4. The acoustic attenuation panel according to claim 2, wherein the discrete fastening supports are disposed over an external contour of the acoustic attenuation panel.

5. The acoustic attenuation panel according to claim 1, wherein the acoustic attenuation panel is shaped to have, after the acoustic attenuation panel is mounted on the carrier element, a clearance between a base of the partition walls and the surface of the carrier element.

6. The acoustic attenuation panel according to claim 5, wherein the clearance is between 0.5 and 1.5 mm.

7. The acoustic attenuation panel according to claim 1, wherein the cells of the central structure have, in a plane of the acoustic front skin, contours forming quadrilaterals.

8. The acoustic attenuation panel according to claim 1, wherein cells of the central structure have, in a plane of the acoustic front skin, dimensions smaller than 60 mm.

9. The acoustic attenuation panel according to claim 1, wherein the acoustic attenuation panel is formed integrally in one-piece by molding of a synthetic material.

10. An acoustic aircraft propulsion unit comprising at least one acoustic attenuation panel according to claim 1.

11. The acoustic attenuation panel according to claim 1, wherein a clearance is formed between a base of the partition walls and the surface of the carrier element when the acoustic attenuation panel is mounted on the carrier member to accommodate geometric deformations of the carrier element.

12. The acoustic attenuation panel according to claim 1, further comprising outer walls between which the partition walls are disposed, and a plurality of fastening supports extending from the outer walls to fasten the acoustic attenuation panel to the carrier element.

13. The acoustic attenuation panel according to claim 1, further comprising fastening supports having ends configured to be in contact with the carrier element to fasten the acoustic attenuation panel to the carrier element, the partition walls having free ends away from the acoustic front skin, the ends of the fastening supports being further away than the free ends of the partition walls from the acoustic front skin.

\* \* \* \* \*